United States Patent [19]
Kitamura

[11] Patent Number: 5,354,028

[45] Date of Patent: * Oct. 11, 1994

[54] ANGLE ADJUSTING DEVICE FOR A DISPLAY DEVICE

[75] Inventor: Yoshiharu Kitamura, Komagane, Japan

[73] Assignee: NHK Spring Co., Ltd., Yokohama, Japan

[ * ] Notice: The portion of the term of this patent subsequent to Dec. 11, 2009 has been disclaimed.

[21] Appl. No.: 633,365

[22] Filed: Dec. 27, 1990

[30] Foreign Application Priority Data

Dec. 28, 1989 [JP] Japan .................................. 1-340397

[51] Int. Cl.⁵ .......................................... F16M 13/00
[52] U.S. Cl. .................................. 248/292.1; 16/342; 188/77 W; 248/923

[58] Field of Search ............... 248/292.1, 923; 16/342, 16/337, 305, 306, 307; 403/146, 373; 188/67, 77 W; 192/8 C

[56] References Cited

U.S. PATENT DOCUMENTS

| | | | |
|---|---|---|---|
| 1,358,099 | 11/1920 | Northcott | 16/307 X |
| 3,459,462 | 8/1969 | Barnard et al. | 16/305 X |
| 4,191,096 | 3/1980 | Benjamin | 16/337 X |

Primary Examiner—David L. Talbott
Attorney, Agent, or Firm—Keck, Mahin & Cate

[57] ABSTRACT

An angle adjusting device to be pivoted on a display device and a main body thereof, herein an angle of inclination of the display is controlled by a frictional force obtained between a rotatable axis and at least a pair of coil spring closely wound over the rotatable axis.

10 Claims, 4 Drawing Sheets

ANGLE ADJUSTING DEVICE FOR A DISPLAY DEVICE

BACKGROUND OF THE INVENTION

The present invention relates to an angle adjusting device for adjusting an angle of inclination of a device such as a laptop type word processor, a personal computer and various lid shaped components to be mounted movably on a main body.

It is necessary for display component to be adjusted to an adequate angular position which is adequate for operator. Therefore, the angle of inclination has been adjusted without step by using various angle adjusting devices. As disclosed by the Japanese Patent Application Laid-open No. 63-23407 and Japanese Utility Model Application Publication No. 1-135397, the conventional angle adjusting devices have a rotatable axis directly or indirectly mounted on a component necessitating an angle adjustment such as display unit, a fixed axis mounted directly or indirectly on a main body and and a coil spring closely inserted over the rotatable axis and fixed axes for locking the rotation of the rotatable axis so as to surround. The display unit can be kept at an arbitrary angular position by means of frictional torque between the rotatable axis and the coil spring, and the rotatable axis can be rotated when an outer force stronger than the frictional torque is applied.

In conventional angle adjusting devices for a display device, a locking torque is obtained by a coil spring when the rotatable axis is rotated to the direction for reducing the coil diameter. When the rotatable axis is rotated to the reverse direction, the coil diameter is enlarged and occurs a slippage (slipping torque).

However, since the conventional angle adjusting devices have only one coil spring for locking operation, only the locking torque or the slipping torque can be obtained in accordance with the turning direction of the rotatable axis. Further feature can not be obtained.

In other words, it is impossible to obtain such feature having a large difference between the locking torque and the slipping torque or to obtain an arbitrary feature in the range of the slipping torque and the locking torque by using the conventional angle adjusting devices.

The present invention was developed considering the above situation and provides an angle adjusting device, which permits an arbitrary feature in designing by using a plurality of set spring.

SUMMARY OF THE INVENTION

In order to carry out above object, an angle adjusting device according to the present invention has a rotatable axis rotatably supported by a fixed axis and at Least one coil spring inserted closely over the rotatable axis and having an end fastened on the fixed axis.

Having above structure, a plurality of coil spring functions indivisually on the rotatable axis and the locking operation of the rotatable axis can be performed by a total torque of the plurality o coil spring. Accordingly, it is possible to provide an angle adjusting device having various features by combining various wire diameters, various coil diameters various windings and various winding directions.

DETAILED DESCRIPTION OF THE PREFERRED EMBODIMENTS

Figure 1:
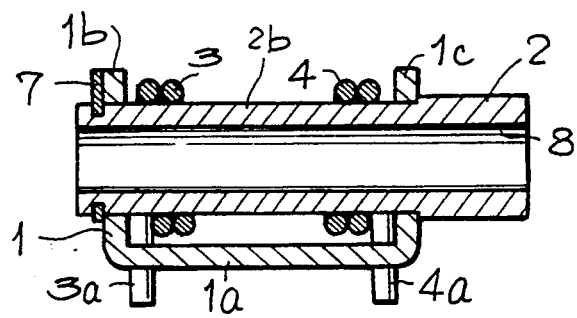
FIGS. 1 to 4 show a sectional view, a front view, a bottom view and a right side view of a first embodiment according to the present invention.
Figure 2:
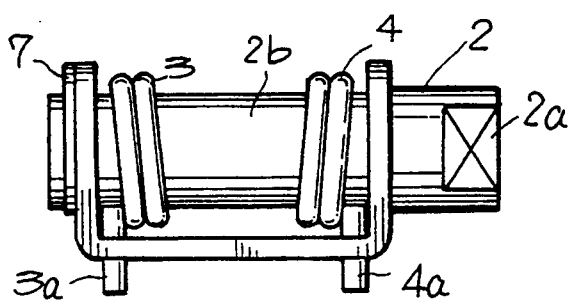
Figure 3:
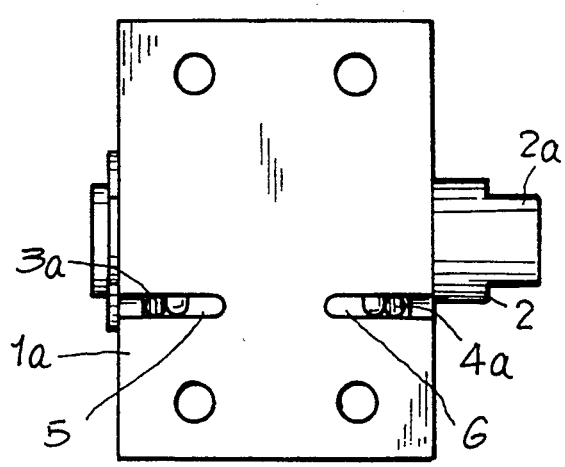
Figure 4:
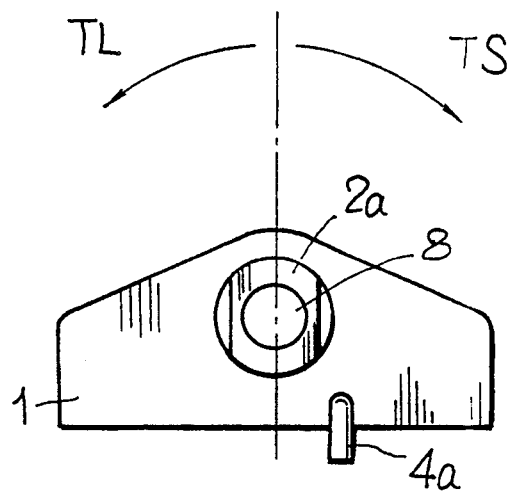
Figure 5:
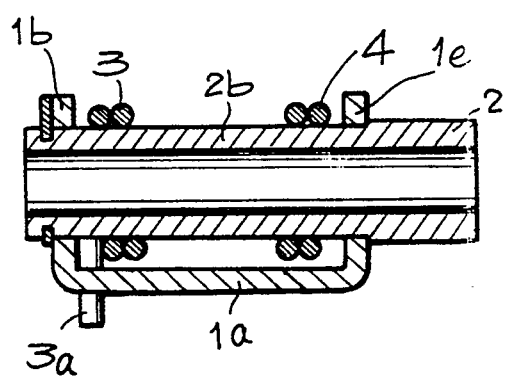
FIGS. 5 to 8 show a sectional view, a front view, a bottom view and a right side view of a second embodiment.
Figure 6:
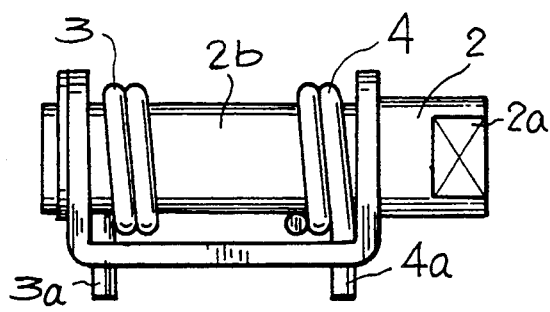
Figure 7:
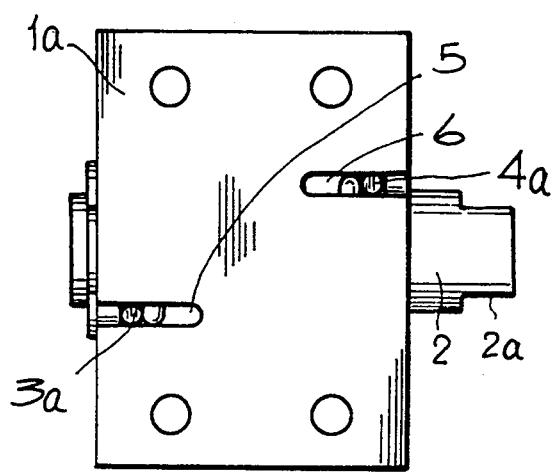
Figure 8:
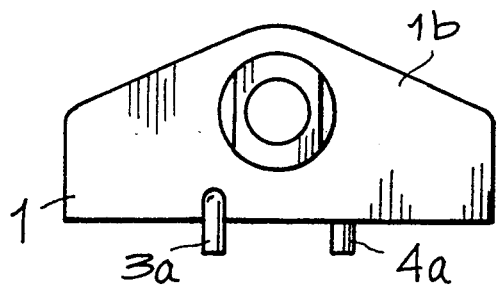

Hereinafter, some embodiments of the angle adjusting device according to the present invention will be described referring to the drawings, wherein identical elements are indicated with identical numerals to prevent a repetitive description.

FIGS. 1 to 4 show a first embodiment of the angle adjusting device according to the present invention. An angle adjusting device is used in a pivoting portion of a main body (not shown) of a device necessitating an angle adjustment of inclination for component thereof such as display device (not shown). It has a bearing 1 to be fixed on the supporting main body directly or indirectly, a rotatable axis 2 to be fastened directly or indirectly on the display device necessitating an angle adjustment of inclination and a plurality of coil spring 3 and 4 closely inserted on the rotatable axis 2. The bearing 1 is of channel form and support the both sides of rotatable axis rotatably, wherein two slits 5 and 6 are provided on the same projected line of the coil spring 3 and 4 on a fixing portion 1a thereof.

The rotatable axis has a small diameter portion 2b supported by both bearing portions, left and right, 1b and 1c of the bearing 1 and retained by a snap ring 7 abutting the left end of a large diameter portion 2 on the right bearing portion 1c. A coupling portion 2a of rectangular or non circular form is formed on the right end of the rotatable axis or coupling to the display device.

The rotatable axis 2 of this embodiment is made of tubular material and has an axial through hole 8, which is used to mount an electrical harness connecting the main body and the display device. Accordingly, an exposed wiring is prevented and a simplification of the wiring structure and a reduction of weight is realized.

The coil springs 3 and 4 are wound in reverse direction mutually and mounted closely over the rotatable axis 2. The inner diameter of the coil springs are a little smaller than the outer diameter of the rotatable axis 2 in free state. Therefore, it has to be mounted on the rotatable axis in enlarged state and retains the former inner diameter so as to gain a frictional force on the rotatable axis when released. These coil springs 3 and 4 have a free end and a hook portion 3a and 4a extending to tangential direction. The hook portions 3a and 4a are inserted in the slits 5 and 6 of the bearing 1.

Having this structure, when an outer force is applied on the rotatable axis 2 fixed on a display device in the direction TS, there occurs a slippage (slipping torque) between the coil springs 3 and 4 and the rotatable axis 2, because the direction TS is the same direction to enlarge the inner diameter of the coil springs 3 and 4. That is to say that the display device is inclined only when an outer force superior to the frictional force is applied, and when the outer force is released, the rotation of the rotatable axis in both directions, the inclination of the display device in the both directions is forked at an arbitrary angle of inclination.

In order to adjust the angle of inclination, it can be done easily by moving the display device so as to turn the rotatable axis 2. Since the angle of inclination is adjusted by the total torque of the slipping torque and the locking torque of the coil springs 3 and 4, the display device is held securely, even though the weight, the dimension or the angle of inclination of the display device is changed. Further, since the directions of the slipping torque and the locking torque of the springs 3 and 4 are same, a Locking torque two times larger than an angle adjusting device with single coil spring is obtained so as to maintain an arbitrary angle of inclination. In this case, the locking torque is much larger than the slipping torque. Therefore, this type of angle adjusting device is effective for rather heavy display device.

FIGS. 5 to 8 show a second embodiment according to the present invention. In this case, the winding directions of the coil spring 3 and 4 are same. Slits 5 and 6 are provided on the different projected lines of the springs 3 and 4 on a fixing portion 1a of a bearing 1, in which a hook portion 3a and 4a of the coil springs 3 and 4 are inserted.

In this embodiment, when an outer force is applied on a rotatable axis 2 in one direction, one of the coil springs 3 or 4 slips on the rotatable axis and the other works to gain a locking torque on the rotatable axis. When another outer force is applied in another direction, the same effect can be obtained. Accordingly, the rotation of the rotatable axis 2 is controlled by the total torque of slipping torque and locking torque of the coil springs 3 and 4 on the rotatable axis 2, and the locking torques in both directions, forward and reverse, are same.

Figure 9:
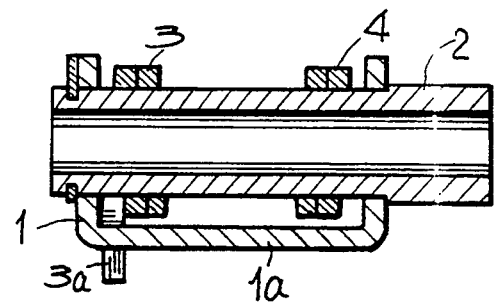
FIGS. 9 to 11 show a sectional view, a front view and a bottom view of a variation of the second embodiment.
Figure 10:
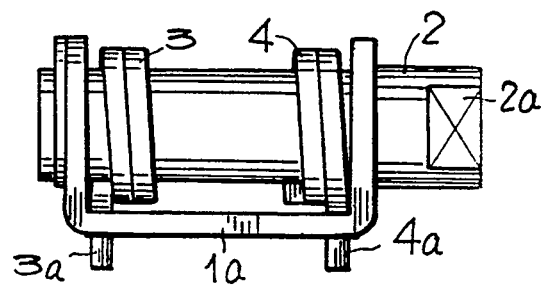
Figure 11:
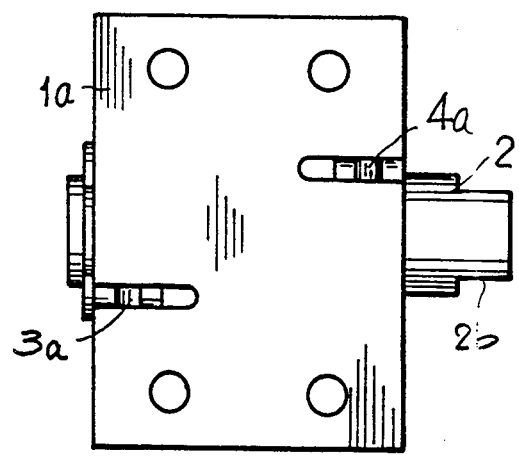

FIGS. 9 to 11 show a variation of the second embodiment, wherein a pair of same spring 3 and 4 are made of square wire so as to obtain good contact on the rotatable axis 2, of which function is same with the former embodiment aforementioned.

Figure 12:
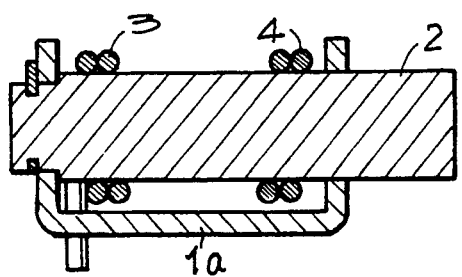
FIGS. 12 to 14 show a sectional view a front view and a bottom view of another variation of the second embodiment.
Figure 13:
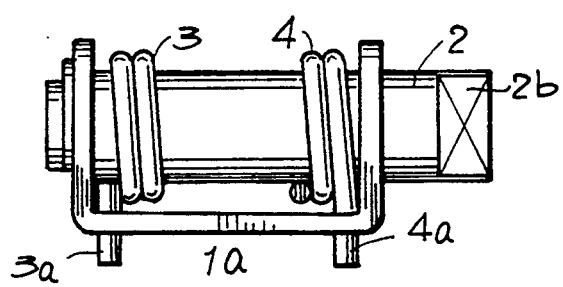
Figure 14:
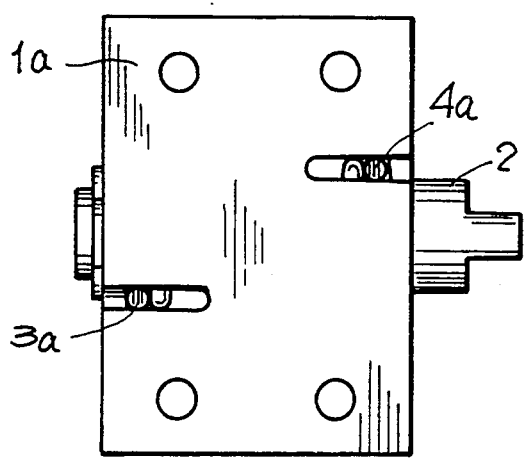

FIGS. 12 to 14 show another variation of the second embodiment, wherein a rotatable axis 2 is solid and other components are same with the second embodiment. Also, it works in the same manner as the former embodiment. This type of angle adjusting device is used for such devices not necessitating an electrical wiring as a lid for utensil. The manufacturing process of the rotatable axis is easier than that of a tubular type axis.

Figure 15:
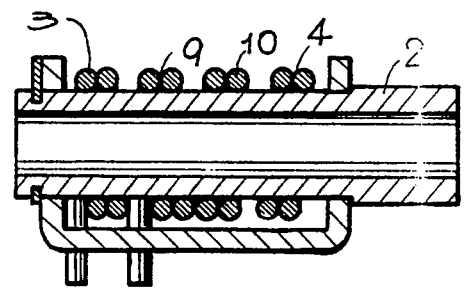
FIGS. 15 to 17 show a sectional view, a front view and a bottom view of a third embodiment.
Figure 16:
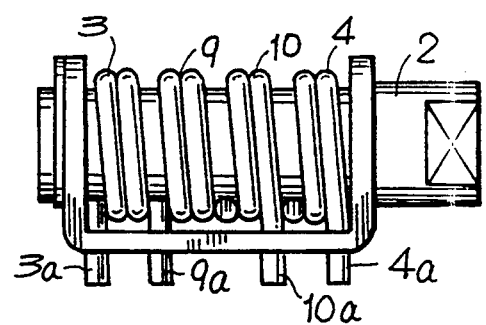
Figure 17:
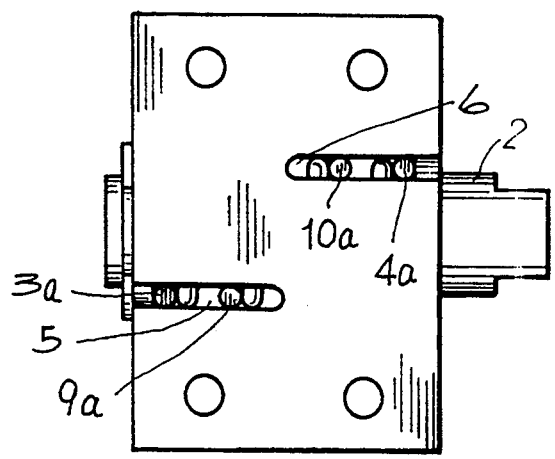

FIGS. 15 to 17 show a third embodiment according to the present invention. A plurality of same coil spring 3, 4, 9 and 10 are mounted closely on a rotatable axis. Hook portions 3a and 9a of the coil springs 3 and 9 are inserted in a slit 5 and the others 10a and 4a are inserted in a slit 6. In this case, each pair of same spring, 3 and 9, and 10 and 4, work together and a two times slipping torque and a two times locking torque are obtained on the rotatable axis in comparison to the second embodiment.

Further, the locking torque may be increased by increasing windings on the pair of coil spring 3 and 4. Also, the winding direction of the coil spring 3 can be inverted. In this case, a larger locking torque is obtained in a direction and a smaller locking torque is obtained in another direction.

Figure 18:
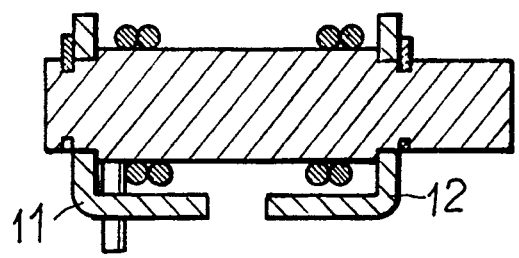
FIGS. 18 to 20 show a sectional view, a front view and a bottom view of a fourth embodiment.
Figure 19:
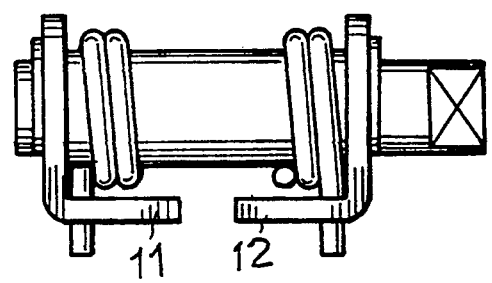
Figure 20:
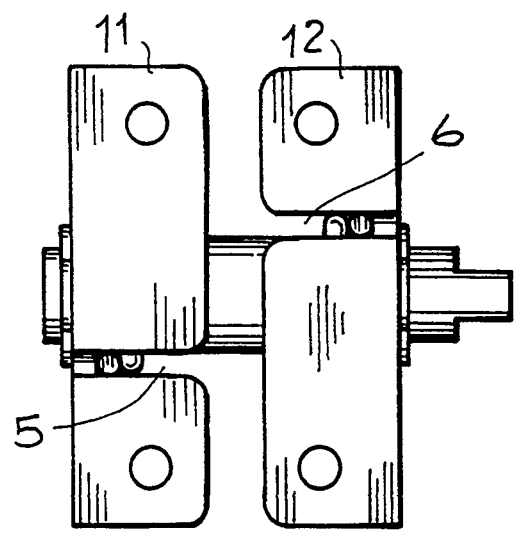

FIGS. 18 to 20 show a fourth embodiment according to the present invention. A solid rotatable axis 2 is rotatably supported by a pair of single bearing 11 and 12 to be fastened on a main body of a display device. It is easier to mount two bearings 11 and 12 on the main body depending on structure thereof than to mount the both sides bearing 1 as disclosed in the former embodiments. For example, the bearing 11 can be fastened on a level portion of a main body and the other on a vertical portion corresponding to the shape and a construction of the supporting device.

In conclusion, the present invention provides an angle adjusting device having a wide operating characteristic and permitting a free designability.

What is claimed is:

1. An angle adjusting device for a display device comprising:
   a channel type bearing means provided with a fixing portion having at least two slits in projected positions of a pair of coil springs to be mounted on the bearing;
   a rotatable axis rotatably mounted on said bearing means; and
   at least a pair of coil springs, closely wound on said rotatable axis and each having a hook portion inserted in a slit of said bearing, wherein each of the springs is dimensioned to provide a locking force on said rotatable axis when the axis is turned in one direction relative to the respective spring and to release said force when the axis is turned in an opposite direction relative to the respective spring.

2. An angle adjusting device according to claim 1, wherein said channel type bearing means comprises two single side bearings each with a slit in a projected position of said coil springs;

3. An angle adjusting device according to claim 1, wherein said rotatable axis is solid.

4. An angle adjusting device according to claim 1, wherein said rotatable axis is of tubular form.

5. An angle adjusting device according to claim 1, wherein at least a pair of identical coil springs are used.

6. An angle adjusting device according to claim 1, wherein of the respective coil springs are wound reversely.

7. An angle adjusting device according to claim 1, wherein at least one coil spring is made of rectangular wire.

8. An angle adjusting device according to claim 1, wherein the springs are each wound in the same direction.

9. An angle adjusting device according to claim 1, wherein the springs are each made of round wire.

10. An angle adjusting device according to claim 1 wherein the axis has a non-circular projecting portion for applying torque thereto.

* * * * *